United States Patent [19]

Matsumiya

[11] Patent Number: 4,906,075
[45] Date of Patent: Mar. 6, 1990

[54] VEHICLE REAR VIEW MIRROR

[76] Inventor: James A. Matsumiya, Sundrift, Camp Road, Gerrards Cross, Buckinghamshire, England, SL9 7PF

[21] Appl. No.: 196,953

[22] Filed: May 20, 1988

[30] Foreign Application Priority Data

| | | |
|---|---|---|
| May 21, 1987 [GB] | United Kingdom | 8712081 |
| Jun. 10, 1987 [GB] | United Kingdom | 8713567 |
| Jun. 26, 1987 [GB] | United Kingdom | 8715070 |
| Aug. 7, 1987 [GB] | United Kingdom | 8718755 |
| Oct. 23, 1987 [GB] | United Kingdom | 8724883 |

[51] Int. Cl.$^4$ .............................................. G02L 1/17
[52] U.S. Cl. ................................................... 350/357
[58] Field of Search ........................ 350/357, 280, 283

[56] References Cited

U.S. PATENT DOCUMENTS

| | | | |
|---|---|---|---|
| 2,118,962 | 5/1938 | Barron | 350/280 |
| 2,471,524 | 5/1949 | Hendricks | 350/283 |
| 3,664,729 | 5/1972 | Moore | 350/283 X |
| 3,722,984 | 3/1973 | Brean | |
| 3,972,600 | 8/1976 | Cobarg | 350/603 |
| 4,171,875 | 10/1979 | Taylor et al. | 350/637 |
| 4,201,451 | 6/1980 | Jacob | 350/278 |

FOREIGN PATENT DOCUMENTS

| | | |
|---|---|---|
| 2332189 | 1/1974 | Fed. Rep. of Germany . |
| 2431869 | 1/1976 | Fed. Rep. of Germany . |
| 2607907 | 1/1977 | Fed. Rep. of Germany . |
| 2605956 | 8/1977 | Fed. Rep. of Germany . |
| 2206515 | 7/1974 | France . |
| 58-043842 | 5/1983 | Japan . |

OTHER PUBLICATIONS

Svensson et al., "Electrochromic Coatings For Smart Windows", SPIE, vol. 502, Optical Materials Technology For Energy Efficiency and Solar Energy Conversion III (1984) pp. 30-37.

Primary Examiner—Eugene R. Laroche
Assistant Examiner—Nathan W. McCutcheon
Attorney, Agent, or Firm—Davis, Bujold & Streck

[57] ABSTRACT

A mirror for a motor vehicle comprises reflective means having a primary surface and a secondary surface, the reflective means being arranged to reflect light which is incident on its secondary surface. A layer on its primary surface adapted to change from a transparent state to a reflective state in response to application of a control signal so as to change the field of view or the intensity of the reflected image. In another form of the invention, the reflective means is arranged, when in a first state, to reflect light from a reflective surface having a first configuration adapted to provide a first field of view. The reflective means can be changed to a second state in which light is reflected from a reflective surface having a second configuration adapted to provide a second field of view differing from said first field of view.

4 Claims, 4 Drawing Sheets

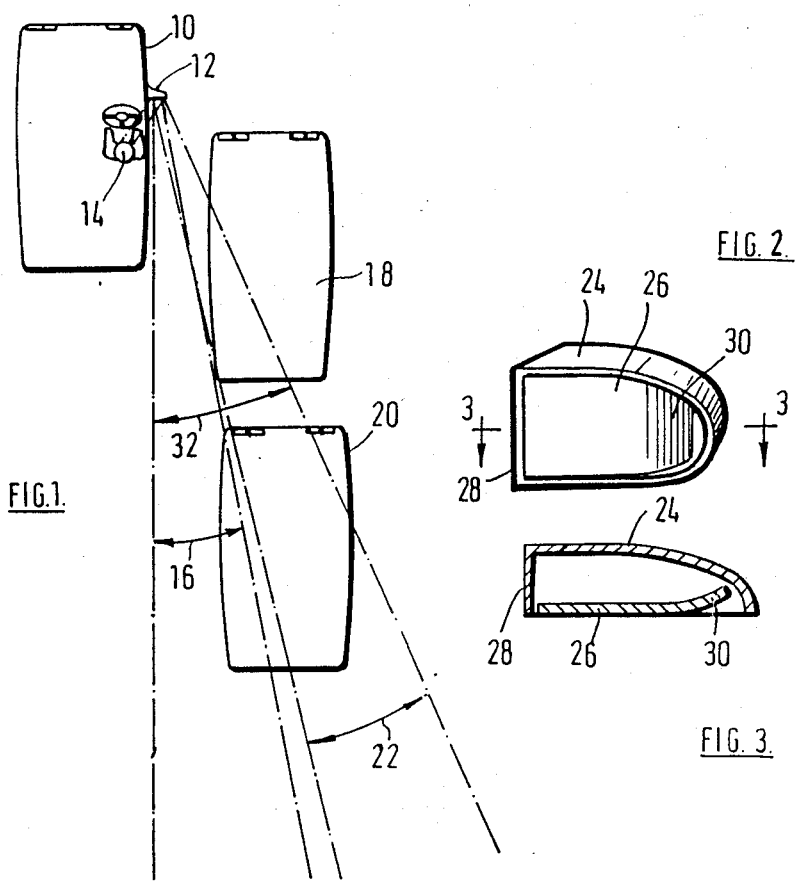

VEHICLE REAR VIEW MIRROR

This invention relates to rear view mirrors for motor vehicles and has application to both exterior and interior mirrors.

One desirable feature of a vehicle rear view mirror is to have as wide a field of view as can be arranged. For this purpose, it has been proposed to make the reflective member of such a mirror of convex shape. However, it has been found that the resulting reduction in size of the perceived image viewed in such a mirror causes dangerous errors in a user's impression of the proximity of following vehicles viewed therein. Consequently, in many countries, regulations require vehicle rear view mirrors either to be plain mirrors or to be convex mirrors of a relatively large radius of curvature, for example greater than 1.8 m. The result of this is that, particularly in the case of a mirror mounted on the driver's door of a motor vehicle, there is a so-called "blind spot" between the disappearance of an overtaking vehicle from the field of view of the mirror and its appearance at the periphery of the driver's direct-vision field of view. This problem is enhanced when the overtaking and overtaken vehicles are on converging paths, for example when the overtaken vehicle is joining a motorway.

It has already been proposed, for example in U.S. Pat. No. 4,331,382, to alleviate this problem by providing an exterior mirror having a flat portion of sufficient dimensions to meet legal requirements together with n outer convex portion, thus extending the field of view to cover the above mentioned blind spot. This has the disadvantage of increasing the extent to which the mirror projects from the side of the vehicle.

Another problem with vehicle rear view mirrors is that, at night, a driver may be dazzled by reflections in his rear view mirrors of light from the headlamps of following vehicles. It is well known to alleviate this problem, particularly in the case of interior mirrors, by providing such mirrors with a first reflective surface having a reflectivity of about 5% and a second reflective surface disposed behind the first reflective surface at an angle to the first reflective surface and having as high a reflectivity as can conveniently be arranged. In use, such a mirror is normally orientated so that the driver sees the required field of view reflected from the second surface, the light reflected from the first surface being from some relatively dark part of the interior of the vehicle so as not to cause confusion. In the event of dazzle, the mirror is tilted so that the driver sees the image of the required field of view reflected from the first surface, comprising only 5% of the intensity of the incident light. The remaining incident light is reflected from the second surface to some other part of the interior of the vehicle. This arrangement suffers from the disadvantage hat, when the mirror is in its normal orientation, the driver may nevertheless perceive stray reflections from the first surface. Also, when the mirror is in its second orientation, dazzling light from the headlamps of a following vehicle may increase the general ambient light level within the vehicle being followed to an undesirable extent.

It is an object of the invention to provide mirrors which overcome the foregoing disadvantages.

According to the invention, in one aspect, a mirror for a motor vehicle comprises reflective means having a primary surface and a secondary surface, the reflective means being arranged to reflect light which is incident on its second surface after passing through its first surface and the first surface carrying a layer of material which is adapted to change from a transparent state to a reflective state in response to application of a control signal.

According to the invention in another aspect, a mirror for a motor vehicle comprises reflective means arranged, when in a first state, to reflect light from a reflective surface having a first configuration adapted to provide a first field of view and control means for changing the reflective means to a second state in which light is reflected from a reflective surface having a second configuration adapted to provide a second field of view differing from said first field of view.

Embodiments of the invention will now be described, by way of example, with reference to the accompanying drawings, in which:

FIG. 1 is a schematic diagram illustrating the blind spot encountered with a conventional exterior door mirror;

FIG. 2 is a perspective view of a known rear view mirror of a type which attempts to alleviate the blind-spot problem illustrated in FIG. 1;

FIG. 3 is a cross-sectional view taken on the line 3—3 in FIG. 2;

Figure 4:
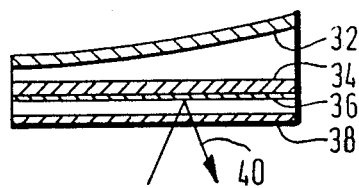
FIG. 4 is a cross-sectional view of the reflective means of an exterior mirror in accordance with a first embodiment of the invention, in a first state.

Referring to FIG. 1, a motor car 10 has an exterior mirror 12 mounted on the door adjacent to the driver 14. The extent of the field of view through the mirror 12 in its normal orientation is illustrated by an arrow 16. It will be seen that a second car 18 which is almost level with the car 10 is outside this field of view while a third car 20 just behind the car 18 is about to leave the field of view. The front of the car 18 has not yet reached the field of view of the driver 14 by direct vision. If the angle of the mirror 12 is adjusted to give the field of view illustrated by arrow 22, which would retain at least the rear of the car 18 in view until its front reaches the direct-vision field of view of the driver 12, then a car behind the third car 16 would not be visible.

FIGS. 2 and 3 show of a known rearwiew mirror 24 of the type illustrated in U.S. Pat. No. 4,331,382, which is suitable for replacing the mirror 12 shown in FIG. 1. The mirror 24 has a reflective member with a planar main zone 26 and a convex cylindrical outer zone 30. The field of view extends over the range illustrated by the arrow 32 in FIG. 1. However, the planar zone 26 alone has to be large enough to meet legal requirements and consequently the extent to which the mirror 24 projects beyond the side of the car on which it is mounted is increased by the width of the convex zone 30.

FIG. 4 shows a first embodiment of the invention comprising a conventional curved mirror 32 located behind a planar glass sheet 34 having a reflective electrochromic layer 36 on its front surface. A protective layer of glass 38 is located in front of the layer 36. The reflective electrochromic layer 36 is capable of adopting either a first state in which it is transparent or a second state in which it is reflective, depending on the application of an electrical signal. The term "reflective electrochromic layer" is used herein to mean a layer having these properties regardless of the nature of the electrical signal necessary to cause the transition.

In the embodiment of FIG. 4, when the reflective electrochromic layer 36 is in its reflective state, the mirror functions as a conventional mirror with a planar reflecting surface, so that incident light is reflected as indicated by the ray 40, giving the field of view illustrated by the arrow 16 in FIG. 1. On the other hand, when the reflective electrochromic layer 36 is in its transparent state, as illustrated in FIG. 5, incident light is reflected from the rear curved mirror 32 as indicated by the ray 42, thus giving the mirror an extended field of view as illustrated by the arrow 32 in FIG. 1.

Figure 5:
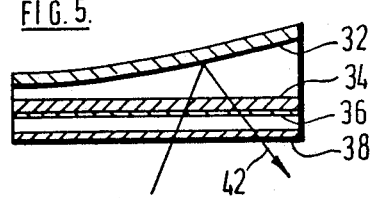
FIG. 5 is a cross-sectional view of the reflective means of FIG. 4 in a second state.

The reflective assembly illustrated in FIGS. 4 and 5 may replace the whole of the reflective member illustrated in FIGS. 2 and 3. Alternatively, it may merely replace the outer zone 30. In either case, the zone of planar reflective surface provided by the reflective electrochromic layer 36 forms part of the minimum legally required planar mirror surface area.

The actuation of the electrical signal which determines the state of the reflective electrochromic layer is determined by action of the driver, either directly via a manually actuable switch or indirectly in response to actuation of the direction indicator or in response to turning of the steering wheel or both. Where automatic actuation is provided, it will usually be desirable to include a manual override.

Figure 6:
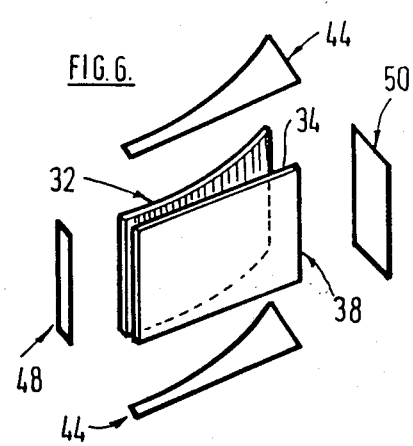
FIG. 6 is an exploded view illustrating the components of the reflective means illustrated in FIGS. 4 and 5.
Figure 8:
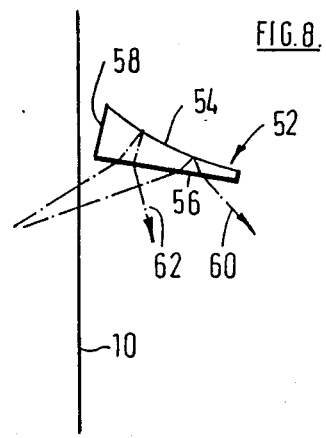
FIG. 8 is a schematic diagram illustrating a modification to the reflective means of FIG. 7.

FIG. 6 illustrates the construction of the embodiment of FIGS. 4 and 5 in more detail. The planar glass sheet 34, carrying the reflective electrochromic surface and the protective glass layer 38, are disposed abutting one another with the reflective electrochromic surface 36 (not shown in FIG. 6) sandwiched therebetween. The curved mirror 32 is coupled to the glass sheets 34 and 38 by top and bottom walls 44 and 46 and side walls 48 and 50 which together form an airtight casing. The internal cavity of the casing is preferably either evacuated or filled with dry air or an inert gas in order to avoid condensation and other contamination on the inner surfaces.

Figure 7:
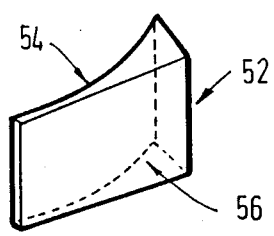
FIG. 7 is a perspective view showing alternative reflective means to those illustrated in FIGS. 4 to 6.

Alternatively, the assembly illustrated in FIG. 6 may be replaced by a single solid block of glass or plastics material 52 as illustrated in FIG. 7. The block 52 has a concave rear surface 54 having a conventional reflective coating to provide a permanent reflective surface. The front surface 56 is planar and is coated with a layer of reflective electrochromic material which reflects or passes light according to its state as described above. The other four faces of the block 52 have non-reflective coatings in order to avoid dual imaging.

The solid block 52 of FIG. 7 is preferably mounted on the door of the vehicle 10 with its thicker end 58 closer to the vehicle. The block 52 acts as a prism so that rays such as the ray 60 close to the outboard end are deflected, by refraction, through a greater angle than rays such as the ray 62 which is closer to the inboard end of the block 54. This reduces the curvature of the surface 54 required to give a particular deflection and consequently enables the thickness of the block 52 to be reduced.

Figure 9:
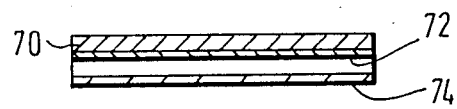
FIG. 9 is a perspective view, similar to FIG. 4, of reflective means for an interior mirror.

FIG. 9 illustrates a reflective assembly, similar to that of FIGS. 4 to 6, which is particularly useful for a vehicle interior mirror. The assembly consists of a planar glass sheet 70 carrying a reflective electrochromic layer 72 on its rear surface. A black light-absorbing sheet 74 is located behind the reflective electrochromic layer 72.

In normal use, the electrochromic layer 74 is in its maximum reflective state. However, if it is desired to reduce the brightness of the reflected image, for example to avoid dazzle from the headlamps of a following vehicle, the electrochromic layer 74 is switched to its transparent state so that the incident light reaches the front surface of the glass sheet 70. About 5% of the incident light is reflected from the front surface of the glass sheet 70 while the remaining 95% is absorbed by the black sheet 74.

Figure 10:
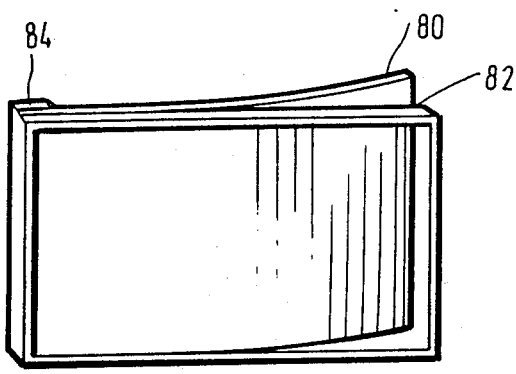
FIG. 10 is a perspective view of a reflective member for an exterior rear view mirror in accordance with another embodiment of the invention, in a first state.
Figure 11:
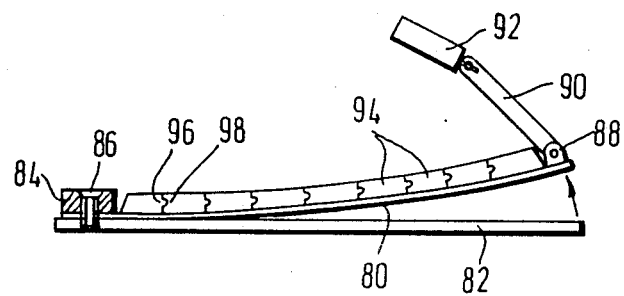
FIG. 11 is a schematic plan view of the reflective member shown in FIG. 10.
Figure 12:
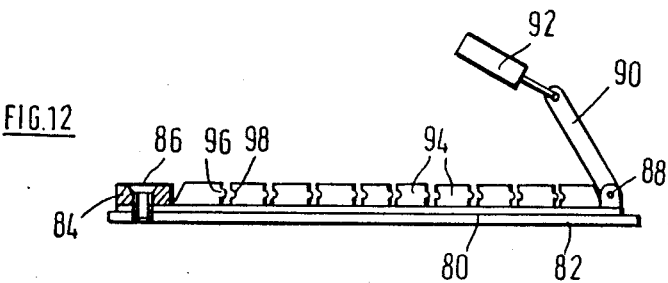
FIG. 12 is a schematic plan view, similar to FIG. 11, but showing the reflective member in a second state.

FIGS. 10, 11 and 12 illustrate another embodiment of the invention having a single reflective surface formed on a substrate 80 of flexible material. The substrate 80 is clamped along one edge to one edge of a rectangular frame 82 by means of a clamping bar 84 which is secured to the frame 82 by screws 86. A reinforcing bar 88 is secured to the opposite edge of the flexible substrate and pivotally coupled by means of a link 90 to a linear actuator 92. The actuator 92 either draws the bar 88 rearwardly away from the frame 82 so as to bend the substrate 80 into a convex cylindrical shape as shown in FIGS. 10 and 11, giving the field of view illustrated by the arrow 16 in FIG. 1, or alternatively presses the bar 88 against the frame 82 so as to force the substrate 80 into a substantially planar shape as illustrated in FIG. 12, giving the field of view illustrated by the arrow 32 in FIG. 1. In order to inhibit distortion of the reflective surface on the substrate due to vibration when it is in its convex shape, a series of mutually parallel reinforcing bars 94 are secured to the back of the substrate 80. Each of the bars 94 is of generally trapezoidal shape so that adjacent sides abut when the substrate 80 is in its fully curved condition. Mutually interlocking formations 96, 98 are formed on such abutting surfaces and move into interlocking relationship so as to add further rigidity. Corresponding rigidity is imparted to the substrate when in its planar state by its abutment with the periphery of the frame 82.

As an alternative to the reinforcing bars 94, a member with a preshaped curved surface may be located behind the frame 82 and the actuator 92 arranged to draw the substrate 80 back on to such surface, so that the substrate 80 takes up the curve defined by such surface.

Figure 13:
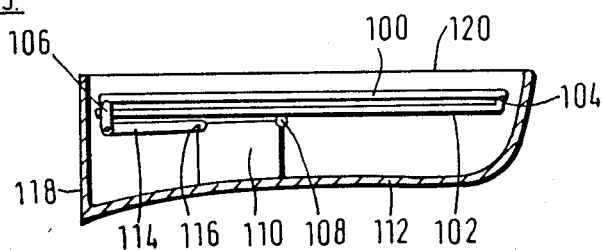
FIG. 13 is a top view of an exterior rear view mirror in accordance with a further embodiment of the invention, with the top part of the cover cut away and with the reflective member in a first state.
Figure 14:
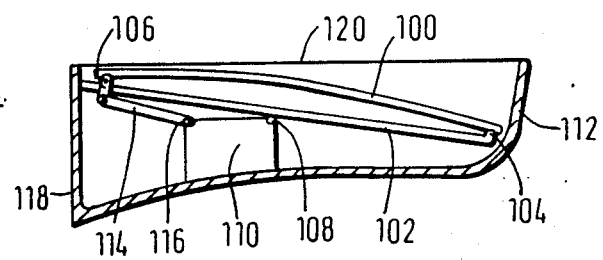
FIG. 14 is a similar view of the mirror shown in FIG. 13 but with the reflective member in a second state.

FIGS. 13 and 14 illustrate another embodiment of the invention which differs from the embodiment of FIGS. 10 to 12 in that a flexible substrate 100, carrying a reflective layer is moved between a bow shape and a flat shape by applying a compressive force to opposite edges thereof. The reflective member 100 is attached along one edge of a mirror carrier 102 by a pivotal connection 104. The opposite edge of the flexible substrate 100 is pivotally attached to a slider 106 which is mounted on the mirror carrier 102 with a sliding movement towards and away from the pivotal coupling 104. A pivotal attachment 108, located at an approximately central location on the mirror carrier 102 is coupled to a mounting member 110 secured to the interior of a mirror housing 112. A coupling link 114 is pivotally attached at one end to the slider 106 and at the other end to a location 116 on the support member 110 spaced apart from the pivotal mounting 108 by a distance such that, when the mirror carrier 102 is substantially parallel to the front edge 120 of the case 112, the link 114 calls the slider 106 in a position such that the flexible substrate 100 is substantially flat. In use, the housing 112 is mounted on a car so that an end face 118 abuts against the car body.

If the mirror carrier 102 is tilted to the position shown in FIG. 14, the link 114 draws the slider 106 towards the pivotal mounting 102, thus compressing the flexible substrate 100 so that it bows to the convex shape illustrated. However, it will be noted that the tilting movement of the mirror carrier 102 ensures that the region of the substrate 100 closest to the slider 106 remains substantially parallel to the front edge 120 of the housing 112. This ensures that the edge of the field of view nearer to the vehicle remains substantially unaltered. In other words, the range of the field of view expands from that illustrated by the arrow 16 to that illustrated by the arrow 32 in FIG. 1.

Figures 15, 16:
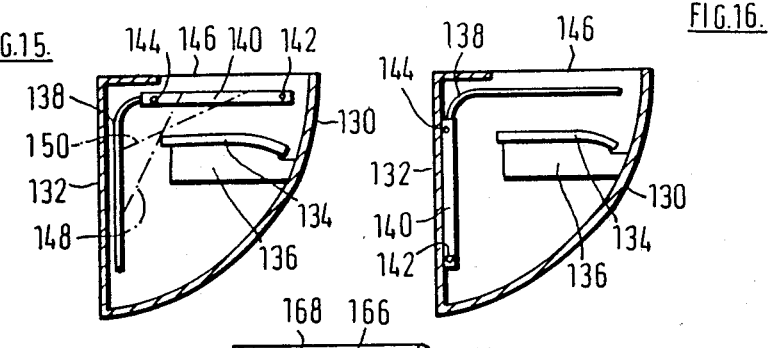
FIG. 15 is a similar view to FIG. 13 of yet another embodiment of the invention.
FIG. 16 is a view similar to FIG. 14 of the embodiment shown in FIG. 15.

FIGS. 15 and 16 illustrate a further embodiment of the invention consisting of a mirror housing 130 having a face 132 adapted to be mounted on the side of a vehicle body. A stationary reflective member 134 of substantially the same shape as the reflective member illustrated in FIGS. 2 and 3 (i.e. having a flat inboard zone and a convex outboard zone) is mounted in the housing on a mounting member 136. An L-shaped slide track 138 is mounted on the interior of the bottom of the housing and a correspondingly shaped track (not shown) is mounted on the inside of the top member. A planar mirror 140 has a pair of guide pegs 142 and 144 projecting upwardly from its upper edge into engagement with the aforesaid track on the top member and a corresponding pair of guide pegs (not shown) engaging in the track 138. When the planar mirror 140 is in the position illustrated in FIG. 15, it is located between the reflective member 134 and an opening 146 in the front of the housing so that the mirror functions as a planar mirror. When the planar mirror 140 is slid to the position illustrated in FIG. 16, the stationary reflective member 134 is visible and the mirror performs in the same manner as the mirror illustrated in FIGS. 2 and 3. As illustrated by the chain dotted lines 148 and 150 in FIG. 15, the planar mirror 140 can move between its two positions without fouling the edge of the stationary reflective member 134.

Figure 17:
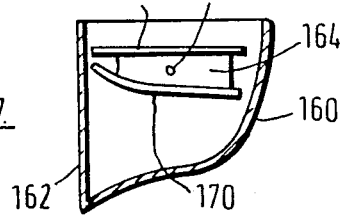
FIG. 17 is a view similar to FIGS. 13 and 15 of a further embodiment of the invention.

FIG. 17 illustrates yet another embodiment of the invention consisting of a mirror mount in a housing 160 having a face 162 adapted to abut against a vehicle body. A mirror carrier 164 is pivotally mounted in the housing 160 for angular movement through 180 degrees about a central vertical axis 166. A planar reflective member 168 is mounted on one side of the mirror carrier 164 and a reflective member 170 of the same shape as that of the mirror shown in FIGS. 2 and 3 is mounted on the other side of the mirror carrier 166. Angular movement of the mirror carrier 164 between the position illustrated in FIG. 17 and a position in which it is displaced through 180 degrees, causes the range of the field of view to change from that illustrated by the arrow 16 to that illustrated by the arrow 32 in FIG. 1.

The embodiments of the invention illustrated in FIGS. 4 to 8 and 15 to 17 have the advantage that the curved reflective member can be of any desired shape (e.g. spherical) while the reflective member of the embodiments illustrated in 10 to 14 can be curved about one axis only. The embodiments of FIGS. 10 to 17 have the advantage of minimizing the number of surfaces through which the reflected light passes, thereby reducing the risk of undesirable multiple reflection. The embodiments of FIGS. 4 to 9 have the advantage that there are no moving parts.

The invention can also be used to provide a mirror with a field of view which is variable in the vertical direction.

We claim:

1. A mirror for a motor vehicle comprising reflective means having a first reflective surface having a first curvature, a second reflective surface having a second curvature and located behind said first reflective surface so as to reflect light incident thereon from said first reflective surface, and a layer of electrochromic material on said first reflective surface responsive to an electrical signal from a control means to change between a first state in which incident light is reflected from said first reflective surface to produce a viewable image having a first field of view and a second state in which incident light passes through said first reflective surface and is reflected from said second reflective surface to produce a viewable image having a second field of view.

2. A mirror according to claim 1, wherein one of said first and second curvatures has a radius greater than 1 m and the other of said first and second curvatures has a radius less than 1 m.

3. A mirror for a motor vehicle comprising a block of transparent material with a first surface having a first curvature and a second surface having a second curvature, the second surface carrying a reflective layer and being located behind said first surface so as to reflect light incident thereon from said first surface, and the first surface carrying a layer of electrochromic material responsive to an electrical signal from a control means to change between a first state in which incident light is reflected from said first surface to produce a viewable image having a first field of view, and a second state in which incident light passes through said first surface and is reflected from said second surface to produce a viewable image having a second field of view.

4. A mirror according to claim 3, wherein said first curvature has a radius greater than 1 m and said second curvature has a radius less than 1 m.

* * * * *